United States Patent Office 3,801,579
Patented Apr. 2, 1974

3,801,579
ACRIDINE AND TRIARYLMETHANE DYESTUFFS FROM DIARYLAMINES
Walter-Ernest Schmidt and Radu Vilceanu, Timisoara, Rumania, assignors to Centrul de Chimie Timisoara, Timisoara, Rumania
No Drawing. Continuation-in-part of abandoned application Ser. No. 51,691, July 1, 1970. This application Jan. 31, 1972, Ser. No. 222,281
Claims priority, application Rumania, Aug. 5, 1969, 60,726
Int. Cl. C07d 37/00
U.S. Cl. 260—279       4 Claims

ABSTRACT OF THE DISCLOSURE

Process for the production of triarylmethane and acridine dyes. Diarylamines and tetrahalogenomethanes are reacted in a mixture of anhydrous zinc chloride with a molor ratio of at least 1:1. The mixture has the functions of catalyst and reaction mixture. The components of the catalyst and the reaction medium may be extracted by water from the crude reaction product.

This application is a continuation-in-part of application Ser. No. 51,691 filed July 1, 1970, now abandoned.

The present invention is concerned with a process of preparing dyes having triarylmethane or acridine structures by catalytic condensation of diarylamines with polyhalogenomethanes.

Attempts have been made to prepare dyes of triarylmethane structure by condensation of aromatic amines with carbon tetrachloride or other tetrahalogenomethanes. The formation of acridine dyes as secondary products in these reactions is also known.

These attempts have not resulted in processes with perspectives of industrial application because of the low yields and conversions realized therewith.

In recent times the reaction between tetrahalogenomethanes and aliphatic amines has been intensively studied, but no condensation products (compounds with a new carbon-carbon bond as referred to the starting compounds) have been detected in any case.

Recently the preparation of triarylmethane products has been described by condensation of secondary aromatic amines with carbon tetrachloride using anhydrous aluminium chloride as catalyst in the presence of an organic solvent, inert with regard to the components of the reaction and the catalyst. For this preparation, see, for instance, Rumanian Pat. 44,551 (Sept. 9, 1959) and 42,085 (June 1, 1961).

This process meets technical difficulties in application because of the very low solubility of the catalyst and the reaction products in the solvent used. Therefore the final reaction mixture has a very high viscosity and is difficult to handle and work up. Other difficulties occur with the necessity of separating and recovering the solvent (trichlorobenzene) from the reaction mixture.

According to the present invention these disadvantages can be eliminated by using as catalyst and reaction medium a solution of anhydrous zinc chloride in the melt of the complex formed by dimethylformamide and zinc chloride. The molar ratio of zinc chloride (total quantity) to dimethylformamide is at least 1:1.

In this medium starting materials and reaction products are soluble at high temperatures.

Dyes with triarylmethane and acridine structure are formed in the condensation reaction. The ratio between them depends on the duration and the temperature of the reaction. Long reaction times and high temperatures favor formation of acridine products.

Zinc chloride and dimethylformamide can easily be separated from the crude reaction product by a simple extraction with warm water. From the extract, the catalyst zinc chloride - dimethylformamide can be recovered by distillation of the water.

The nonreacted amine can be extracted from the crude reaction product after the separation of zinc chloride and dimethylformamide by known methods, for example with organic solvents.

To obtain a dye of triarylmethane structure as the main reaction product, it is recommended to interrupt the reaction at conversions of 50–75% (the conversion level referred to the starting amine).

The dyes obtained are practically insoluble in water and therefore of limited interest as such. The dye derived from diphenylamine, however, is an important intermediate for the production of sulfonated derivatives with wide applications.

More specifically, by the aryl structure, it is intended to define an aryl group as phenyl or naphthyl and also by the generic formula:

$$AR-N(R)-Ar$$

wherein

A = phenyl or naphthyl and
R = methyl, ethyl, or hydroxyethyl

Also, more specifically, the term tetrahalogenomethanes is intended to define compounds having the generic formula $CCl_xBr_{4-x}$, wherein $x$ may be 0, 1, 2, 3, or 4, and the halogen may be chloro- and bromo-derivatives.

As tetrahalogenomethanes, for example carbon tetrachloride, carbon tetrabromide and others having a similar reactivity and falling in the generic formula above, and as diarylamines, for example diphenylamine, phenyl-naphthylamines and their various substitution products having free para-positions can be used in the instant reaction.

Employing the method of this invention, the condensation process can be conducted in homogeneous phase, so that difficulties in handling and processing the reaction mixture are avoided. Catalyst and reaction medium can easily be separated from the reaction mixture by extraction with warm water and subsequently regenerated in a simple way by concentrating the aqueous extract.

The following examples are given for the purpose of illustrating the present invention.

EXAMPLE 1

50.7 g. diphenylamine and 76 g. anhydrous zinc chloride are added to 30 cc. dimethylformamide, the mixture is heated to 140–150° C. until a homogeneous mobile mass is obtained (30–60 minutes). After cooling to 70- C. 12 cc. carbon tetrachloride is added. The mixture is stirred under reflux 3 hours at 75–85° and turns blue. Then the temperature is raised within 3 hours to 135–145° C. and maintained for 6–12 hours at this temperature until the reaction slows down. To compensate eventual losses, corresponding quantities of liquid carbon tetrachloride are added to the mixture, or carbon tetrachloride vapors are introduced into the mixture while maintaining it at high temperatures.

After the interruption of the reaction the mixture is poured into 300 cc. water. The suspension is heated and stirred, so that dimethylformamide and zinc chloride dissolve in the water. After cooling the mixture, the aqueous extract is decanted. The extraction with warm water is repeated one or two times.

After decanting and drying the crude product contains triarylmethane and acridine dyes besides nonreacted diphenylamine. This can be extracted with hot benzene to obtain a purified sample of the dye.

Conversions of 60–85% and yields over 90% (both referred to diphenylamine) can be realized under the conditions described.

The initial complex of zinc chloride and dimethylformamide can be regenerated by simple distillation of the water from the aqueous extract and the recovered complex used for another synthesis.

The triphenylmethanic dye derived from diphenylamine and carbon tetrachloride in the above reaction is C.I. 42760 (C.I. Solvent Blue 23). (Colour Index, 2nd Edition.)

The following will describe in greater detail the method for regeneration of the catalyst.

The aqueous extract of zinc chloride and dimethylformamide obtained by decantation from the crude dye in the reaction above described allowed to repose for at least 24 hours. Small quantities of resinous substances are eliminated by deposition on the walls of the vessel. Finally, the aqueous solution is almost colorless, and has no solid substances in suspension. This solution is heated in a usual distillation equipment with a column, so that the temperature in the boiling liquid does not exceed 150° C. and the temperature of the vapors leaving the column is below 120° C. After the water has been eliminated, the distillation is stopped. The residue in the distillation vessel is a molten mixture of zinc chloride and dimethylformamide that can be immediately used for a new synthesis reaction by adding diphenylamine, cooling to 70° C. and adding carbon tetrachloride as described in the procedure above.

10 g. of the dye, from which unreacted diphenylamine has been extracted as described above, is added slowly to 30 g. oleum with 20% $SO_3$ under vigorous stirring. The temperature is maintained below 40° C. by external cooling. The mixture obtained is heated under continuous stirring up to 90–95° C. and maintained at this temperature for 6 hours. The reaction mixture is poured into 150 ml. water, $Ca(OH)_2$ is added to neutralize the acidity, and the $CaSO_4$ precipitated is filtered off. The filtrate is concentrated to 30 ml. the quantity of $Na_2SO_4$ required to transform the calcium salts into sodium salts is added, and the $CaSO_4$ formed is filtered off. The filtrate is evaporated to dryness, resulting in 12–13 g. of the sodium salt of the trisulfonated dye.

An aqueous solution containing 1–2% of the sulfonated dye and 0.03–0.05% acetic acid is an excellent writing ink with a brilliant blue shade.

The trisulfonated derivative is C.I. 42780 (C.I. Acid Blue 93), the sodium salt of the sulfonic acid.

C.I. 42760 is formed by the reaction:

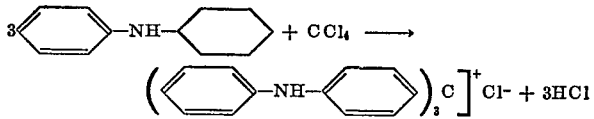

Acridinic dyes are basic dyes with structures analogous to the examples listed in Colour Index under No. 46000–46080, especially N-phenylated derivatives of the dye C.I. 46045 (Chrysaniline) with the following structure:

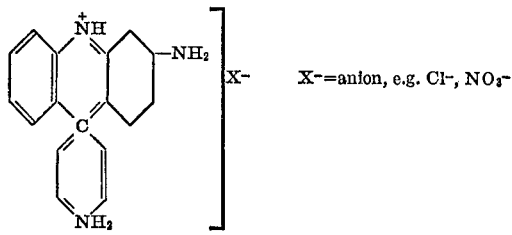

$X^-$ = anion, e.g. $Cl^-$, $NO_3^-$

EXAMPLE 2

50.7 g. diphenylamine and 76 g. anhydrous zinc chloride are added to 30 cc. dimethylformamide and the mixture is heated to 140–150° C. until all zinc chloride is dissolved. After cooling to 90° C., 3.6 g. carbon tetrabromide is added. The mixture rapidly turns blue. Within 4 hours the temperature is raised up to 130–140° C. and maintained for 8–16 hours until the reaction slows down.

The mixture is poured into 300 cc. water, the suspension is heated and stirred to extract water soluble components. After cooling the aqueous extract is decanted and the extraction repeated.

The crude product obtained after decanting and drying is extracted with hot benzene to eliminate nonreacted starting materials.

The same dye as in Example 1 is obtained, but as hydrobromide, with yields of about 90% and conversions of 50–80% (referred to diphenylamine).

EXAMPLE 3

In 45 cc. dimethylformamide 115 g. anhydrous zinc chloride is dissolved by stirring and heating to 140–150° C. After cooling to 80° C. 66 g. phenyl-2-naphthylamine and 12 cc. carbon tetrachloride are added. The temperature is raised within 3–5 hours to 130–140° C. and maintained for 5–10 hours. The same procedure as in Example 1 is used to compensate losses of carbon tetrachloride.

The reaction mixture is worked up by pouring into water, 2–3 extractions with warm water and an extraction with benzene of the crude dye to remove nonreacted amine.

A mixture of dyes with triarylmethane and acridine structure of yellow-brown shades is obtained with yields of 80–90% and conversions of 50–80% (referred to the amine).

What is claimed is:

1. A process for the production of triarylmethane and acridine dyes wherein diarylamines in which the aryl group is selected from the group consisting of phenyl and naphthyl, and tetrahalogenomethanes selected from the group of the formula $CCl_xBr_{4-x}$ in which $x$ may be 0–4, are reacted in a mixture of anhydrous zinc chloride and dimethylformamide with a molar ratio of at least 1:1, respectively, having the function of catalyst and reaction medium, then the components of the catalyst and the reaction medium are extracted by water from the crude reaction product, and finally catalyst and reaction medium are regenerated by elimination of the water from the aqueous extract obtained by extraction on the crude reaction product.

2. A process according to claim 1, in which diphenylamine is reacted with carbon tetrachloride.

3. A process according to claim 1 in which diphenylamine is reacted with carbon tetrabromide.

4. A process according to claim 1 in which phenyl-2-naphthylamine is reacted with carbon tetrachloride.

References Cited

UNITED STATES PATENTS

| | | | |
|---|---|---|---|
| 3,347,047 | 10/1967 | Baliester | 260—389 |
| 3,670,024 | 6/1972 | Krimm | 260—393 |
| 1,807,355 | 5/1931 | Ter Horst | 260—279 |
| 3,046,209 | 7/1962 | Sprague | 260—391 |
| 3,689,495 | 9/1972 | Lohmann | 260—391 |

FOREIGN PATENTS

| | | | |
|---|---|---|---|
| 42,085 | 4/1962 | Rumania. | |
| 44,551 | 7/1966 | Rumania. | |
| 940,779 | 11/1963 | Great Britain | 260—279 |

DONALD G. DAUS, Primary Examiner

U.S. Cl. X.R.

260—388, 389; 106—22